Oct. 14, 1969   J. G. WILLIAMS   3,473,102
AUTOMATIC LIQUID LEVEL INDICATOR
Filed Jan. 23, 1968   2 Sheets-Sheet 1

INVENTOR.
JEREMY G. WILLIAMS
BY Harry A. Herbert Jr.
Arsen Tashjian
ATTORNEYS

Oct. 14, 1969     J. G. WILLIAMS     3,473,102

AUTOMATIC LIQUID LEVEL INDICATOR

Filed Jan. 23, 1968     2 Sheets-Sheet 2

INVENTOR.
JEREMY G. WILLIAMS
BY Harry A. Herbert Jr.
Arsen Tashjian
ATTORNEYS

United States Patent Office 3,473,102
Patented Oct. 14, 1969

3,473,102
AUTOMATIC LIQUID LEVEL INDICATOR
Jeremy G. Williams, Star Rte. 1, Box 59,
Rosamond, Calif. 93560
Filed Jan. 23, 1968, Ser. No. 699,814
Int. Cl. H02p 1/04; H02h 7/08
U.S. Cl. 318—482                        4 Claims

ABSTRACT OF THE DISCLOSURE

An automatic liquid level indicator having a float containing a piece of magnetic material and positioned in a tank by the level of the liquid therein. A follower assembly including vertically spaced switching means actuated by the magnetic float is located exteriorly of the tank. A two-phase motor is controlled by the switching means such that vertical movement of the float produces a corresponding signal which drives the motor in the proper direction to maintain the position of the follower assembly opposite the magnetic float thereby indicating the level of the liquid in the tank.

BACKGROUND OF THE INVENTION

This invention relates to a system for measuring the liquid level within a vessel without any mechanical connection to the interior thereof and, more particularly, the system is concerned with providing a liquid level indicator which includes a follower assembly which automatically assumes the position of the float located inside the vessel without any electrical voltage or current being applied through the wall of the vessel.

Heretofore, considerable danger and difficulty has been encountered during the handling of liquids which are volatile and toxic in nature. This is especially true when it becomes necessary to measure the level of these liquids inside a closed tank or vessel. In gauging the liquid level of propellant run tanks, especially those propellants which are so toxic or corrosive as to prohibit the use of openings of any sort into the container, presently known systems generally require a mechanical connection with the interior of the tank or the passage of electrical voltage or current through the tank or liquid. Thus, a potentially hazardous situation is created with many inherent disadvantages being present, such as, the leakage of inflammable vapors into the atmosphere with the resultant danger of fire as well as the dangers caused by the presence of electrical energy within the tank structure.

SUMMARY OF THE INVENTION

The present invention is primarily concerned with the provision of a system for accurately determining the liquid level of the contents of a closed tank or vessel. In the practice of the invention, a float which contains a piece of magnetic material is positioned in the tank by the level of the liquid in the tank. A follower assembly located exterior of the tank contains two switches which are activated by the magnetic float. The follower assembly is driven by a two phase motor through a gear train and an assembly of cables and pulleys. The two phase motor is driven by a bridge system and amplifier which is triggered by the switches on the following assembly.

The above-described arrangement causes the follower assembly to assume the same relative position as the float. Read out of the system can be accomplished in several ways. First, by visual observation of the follower assembly. Second, by observation of an indicator attached to the cable system. Third, by attaching a potentiometer to the driving system, a variable resistance or voltage can be created which is proportional to the relative position of the magnetic float. This can be read by any of the standard instrumentation means, such as digital voltmeters, resistance bridge systems, direct reading meters or converted into a signal which may be applied directly to a computer or other instrumentation system.

Accordingly, it is an object of the invention to provide a safe and accurate liquid level indicator for use with sealed tanks containing corrosive and toxic liquids.

Another object of the invention is to provide a liquid level indicator which operates automatically without requiring the manual moving of the follower assembly.

Still another object of the invention is to provide an indicator for determining the liquid level in a sealed tank without any mechanical or electrical connection to the interior of the tank.

A further object of the invention is to provide a liquid level indicator which is suitable for measuring the level of toxic propellant run tanks and for use with cryogenic liquids which must necessarily be stored in closed receptacles.

Another further object of the invention is to provide a liquid level indicator having a magnetic float inside a tank which actuates a follower assembly outside the tank to control a two phase motor operating to maintain the magnetic float and the follower assembly in vertical alignment with each other in response to the signals from the follower.

A still further object of the invention is to provide a liquid level indicator which is strong and reliable and which is safe for use with highly corrosive and inflammable liquids.

These and other objects, features and advantages will become more apparent after considering the description that follows and from the drawings wherein like numbers are used throughout to identify like elements.

PREFFERED EMBODIMENT OF THE INVENTION

Although the utilization of the present invention is directed toward its use with toxic and corrosive liquids, it should be understood that equally effective use of the invention can be made with nontoxic and noncorrosive liquids. However, since the tank level of these last named liquids are so easily measured, the primary utility of the herein described liquid level indicator is for use with cryogenic and highly corrosive liquids such as liquid fluorine. Thus, the invention is particularly useful where the liquid to be measured must necessarily be retained in a sealed tank to prevent exposure to the air or contamination.

Figure 1:
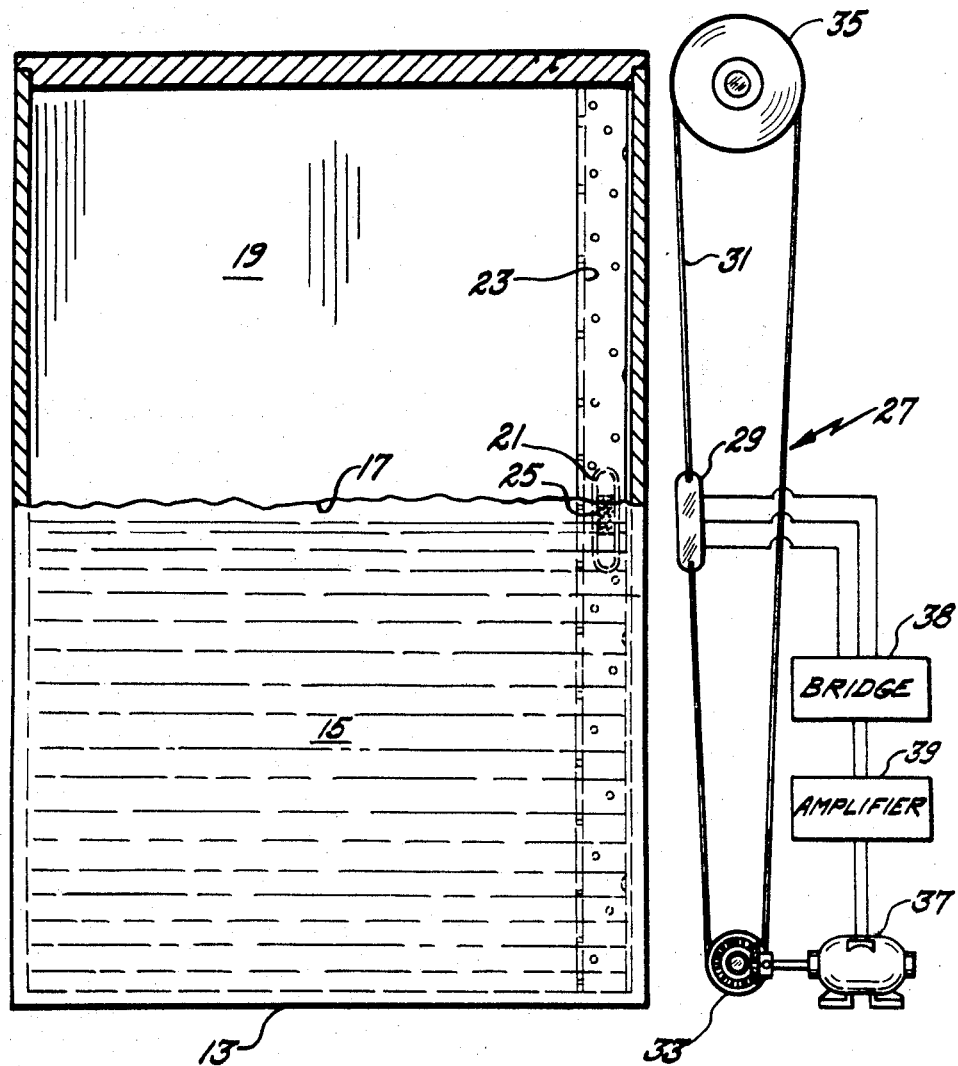
FIGURE 1 is a view in elevation partly in cross section and partly schematic showing the tank and follower assembly according to the present invention.

Referring now to FIGURE 1, there is shown a tank 13 containing a liquid 15 up to the level 17. The space 19 located above the liquid level 17 would ordinarily be filled with the vapors from the liquid 15. If the liquid 15 has corrosive properties, an extremely hazardous condition is created requiring that the tank 13 be sealed.

Although the tank 13 is shown completely sealed, it is obvious that in practice certain openings are required in order for the tank to be put into use. Normally, for example, an inlet and an outlet would be present for filling and emptying the tank during its operation. However, since these openings do not relate to the present invention and are well known in the prior art, they are not included in the drawing.

The liquid level indicator according to the invention includes a float 21 arranged to maintain its position on the surface of the liquid 15 at the level 17. A float chamber 23 in the form of a cylindrical tube is positioned at one side of the tank 13 restricting the float 21 to vertical movement adjacent to the wall of the tank. When used with corrosive liquids, such as liquid fluorine, the float 21 is fabricated of a thin metallic material preferably stainless steel and includes a magnetic material 25 located near the central section thereof. In a typical configuration, the float 21 is in elongated capsular form and is lightly guided by the chamber 23 so that it will not be hampered in seeking its true level at the surface of the liquid in the tank. Since the float 21 will settle at different surface depths depending upon the specific gravity of the liquid 15, a calibration table may be provided in order to indicate the liquid level with complete accuracy.

Figure 3:
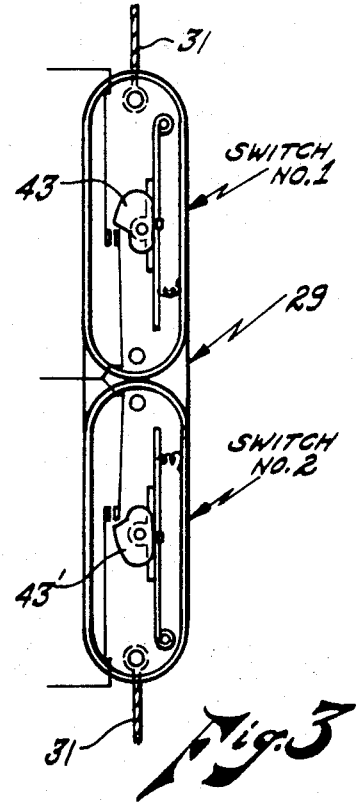
FIGURE 3 is an enlarged detail view of one switch arrangement activated by the magnetic float to control the direction of operation of the motor.
Figure 4:
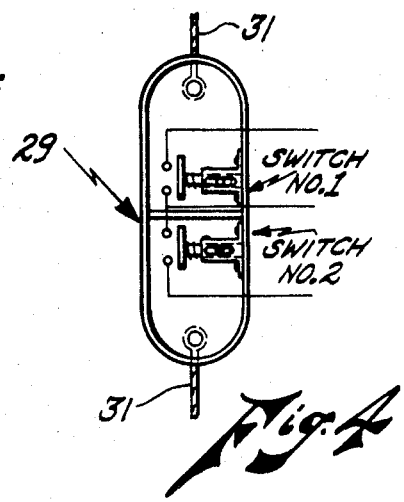
FIGURE 4 is an enlarged view of another switch arrangement for use with the invention.

A follower assembly generally designated by the reference numeral 27 is located outside the tank 13 adjacent to the wall area which contains the float chamber 23. Switching means 29, shown in detail in FIGURES 3 and 4, is fixedly attached to a cable 31 which moves vertically when the pulleys 33 and 35 rotate. A two phase motor 37 drives the pulley 33 which operates to move the switching means 29 up or down with the cable 31 depending on the direction of rotation which, in turn, is controlled by the change in position of the float 21. A bridge 38 and amplifier 39 are interposed in the lines between the switching means 29 and the motor 37. The unbalance of the bridge circuit 38 produces a signal which is amplified and fed to the motor 37. The resultant movement causes the follower assembly switching means 29 to assume the same vertical relative position as the float 21 in the tank 13.

Figure 2:
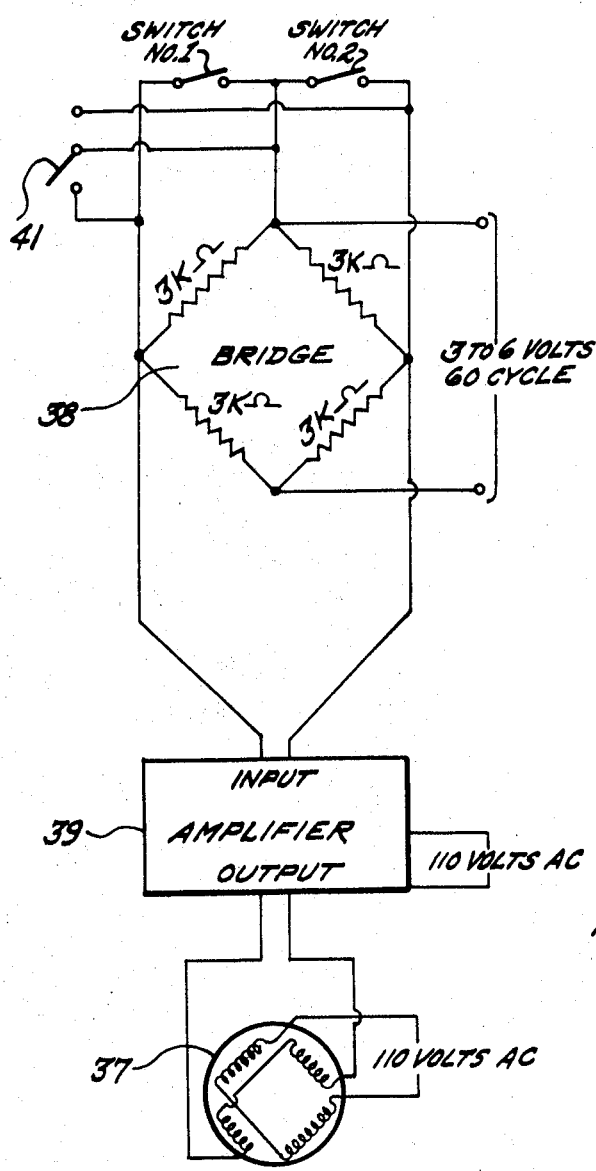
FIGURE 2 is a schematic diagram of the electrical circuitry which is utilized in providing the automatic control system for maintaining the follower assembly in alignment with the magnetic float.

In FIGURE 2, there is shown a circuit diagram of the switching means and the two-phase motor with the bridge 38 and amplifier 39 shown therebetween. A double throw switch 41 operates to recycle the system by initially positioning the follower assembly opposite the float 21. The operation of the recycle duplicates the action of the switching means 29 and causes the follower assembly to seek the position of the magnetic float 21.

FIGURES 3 and 4 show two different arrangements of switching means 29. In FIGURE 3, a pair of latching pawls 43 and 43' are pivotably attached so that when the magnetic float moves away from the switch the switch closes and is held in the closed position by the pawl until it again becomes positioned opposite the float 29 at which time it automatically reopens. This arrangement is particularly useful where the rate of liquid level change may exceed the driving speed of the motor 37. In the arrangement shown in FIGURE 4, the latching pawls are omitted and the switches are vertically spaced so that both switches are closed when the float 21 is directly opposite the switching means 29. As the float 21 moves upward switch No. 2 opens thereby unbalancing the bridge 38 causing the follower assembly to move upward. Conversely, when the float 21 moves downward switch No. 1 opens and produces a signal which causes a corresponding downward movement of the follower assembly.

MODE OF OPERATION OF THE INVENTION

The hereinbefore described automatic liquid level indicator provides an economical solution to the problem of measuring liquid level in toxic propellant run tanks, especially those propellants which are so toxic or corrosive as to prohibit the use of openings of any sort into the container. The system has a wide application in measuring liquid levels in all type of fluids, both locally and remotely, and can be utilized anywhere a requirement for this type of system exists.

In operation, the presence of the magnetic float 21 on the inside of the tank 13 opposite the switching means 29 causes the switch No. 1 to close by magnetic action. As can be seen in the switch detail drawing FIGURE 3, there is a latching pawl 43 which is also actuated when the magnet 25 in the magnetic float 21 moves away from the switch in the upward direction. This will leave the switch in the closed position. However, if the magnetic float 21 moves away in the downward direction, the switch will open. The action of switch No. 2 is reversed, that is, it opens on an upward movement of the magnetic float 21.

The magnet material 25 is enclosed in a stainless steel float 21 which floats on the surface 17 of the liquid 15. When the magnetic float 21 is opposite the switching means 29 of the follower assembly 27, both switch No. 1 and switch No. 2 are closed and there is no output signal to the amplifier 39. However, when the float 21 moves upward, switch No. 2 opens producing an unbalance in the bridge circuit 38 thus providing an input voltage to the amplifier 39. The amplifier 39 produces an output voltage which causes the motor 37 to drive the follower assembly 27 upward. When the switching means 29 of the follower assembly 27 is opposite the float 21, switch No. 2 closes which rebalances the bridge 38 and the driving action stops. If the float 21 moves in the downward direction, switch No. 1 opens and the same process occurs except that the voltage is reversed and the motor 37 drives the follower assembly 27 downward.

There is a double throw recycle switch 41 which is used to initially position the following assembly 27. Operation of the switch 41 duplicates the operation of the switches No. 1 and No. 2 of the switching means 29 on the follower assembly 27 causing the follower assembly to seek the magnetic float. When the follower assembly 27 is opposite the float 21, operation of the recycle switch 41 will not cause any driving action since the magnetic switches No. 1 and No. 2 have shorted the recycle switch 41 out of operation.

In normal operation, the follower assembly 27 is always opposite the float 21 and is, therefore, a true indication of the tank or system liquid level. If the amplifier is on the line on a continuous basis and the rate of level change does not exceed the driving speed of the motor 37, the latching pawls 43 shown in FIGURE 3 may be omitted and the switching arrangement shown in FIGURE 4 may be used. In this last named arrangement, the magnetic switches No. 1 and No. 2 are spaced about one-half inch apart and operate in the same manner as described above except that latching is not necessary because the motor 37 is capable of maintaining the follower assembly 27 in alignment with the float 21.

Read out of the system can be accomplished in several ways. First, by visual observation of the position of the follower assembly 27. Second, by observation of an indicator attached to the cable system. Third, by attaching a potentiometer to the driving system, for example, at the pulley 35. A variable resistance or voltage is created which is proportional to the relative position of the magnetic float 21. This can be read by any of the standard instrumentation means such as digital voltmeters, resistance bridge systems, direct reading meters or converted into a signal which may be applied directly to a computer or other instrumentation system. In order to operate satisfactorily, it is recommended that all parts of the liquid level indicator be manufactured out of nonmagnetic materials, such as stainless steel, aluminum, or brass, except for the magnet and the two switches.

Although the invention has been illustrated in the accompanying drawings and described in the foregoing specification in terms of preferred embodiments thereof, the invention is not limited to these embodiments or to the particular uses mentioned. It will be apparent to those skilled in the art that my invention can be used on a tank having a standpipe with a magnetic float therein and containing the liquid at the same level as inside the tank with the follower assembly adjacent to the standpipe. Also, it should be understood that various changes, alterations, modifications and substitutions, particularly with respect to the construction details, can be made in the arrangement of the several elements.

Having thus described my invention, what I desire to secure by Letters Patent of the United States is:

1. An automatic liquid level indicator for measuring the level of liquid in a closed tank, said indicator comprising a magnetic float positioned on the surface of the liquid in said tank, a vertically oriented elongated float chamber positioned adjacent to one wall of said tank within which said float is positioned, said chamber extending from the bottom to the top of said tank, said float chamber restricting the movement of said magnetic float to the vertical direction, a follower assembly including a pulley-mounted cable means located outside said tank adjacent to the wall thereof opposite said float chamber and in alignment therewith and switching means on said cable means for sensing the vertical movement of said magnetic float, and motor means for driving said cable means of said follower assembly vertically in response to a signal from said switching means, the direction of movement of said magnetic float causing said switching means to determine the direction of current flow through said motor means and thus the direction of rotation of said motor means to produce a corresponding vertical movement of said follower assembly to effectively maintain said follower assembly in position opposite said magnetic float thereby indicating the level of the liquid in the tank.

2. The automatic liquid level indicator defined in claim 1 wherein the switching means includes a pair of magnetically operated vertically spaced switches, both of said switches being closed when said magnetic float is directly opposite said switching means, the upper one of said switches opening in response to downward movement of said magnetic float when the liquid level in said tank is lowered and the lower one of said switches opening in response to upward movement of said magnetic float when the liquid level in said tank is raised.

3. The automatic liquid level indicator defined in claim 2 wherein a bridge circuit is interposed between said switching means and said motor means, the opening of said first and second switches creating an unbalanced condition in said bridge circuit to produce a signal having a current flow in a predetermined direction corresponding to the condition of the switches, amplifying means for receiving and amplifying the signal from said bridge circuit, said motor means being responsive to the direction of current flow from said amplifying means.

4. The automatic liquid level indicator defined in claim 3 wherein a manually operable double throw recycling switch is operatively connected across the first and second switches for initially positioning said switching means, said recycling switch serving to effectively duplicate the action of said first and second switches causing the follower assembly to seek the position of said magnetic float, the recycling switch being shorted out of operation when said switching means and magnetic float are directly opposite each other.

References Cited
UNITED STATES PATENTS

| | | | |
|---|---|---|---|
| 2,682,026 | 6/1954 | Mesh et al. | 318—482 X |
| 2,704,342 | 3/1955 | Fielden | 73—313 X |
| 2,714,167 | 7/1955 | Herzog | 318—482 |
| 2,853,878 | 9/1958 | Anderson et al. | 73—313 |
| 3,224,270 | 12/1965 | Karol et al. | 73—313 X |
| 3,283,578 | 11/1966 | Moore. | |

LOUIS R. PRINCE, Primary Examiner

DANIEL M. YASICH, Assistant Examiner

U.S. Cl. X.R.

73—313